US010099952B2

(12) United States Patent
Chen et al.

(10) Patent No.: US 10,099,952 B2
(45) Date of Patent: Oct. 16, 2018

(54) METHOD FOR TREATING ORGANIC WASTEWATER AND ORGANIC WASTEWATER TREATING SYSTEM

(71) Applicants: TONGJI UNIVERSITY, Shanghai (CN); NANJING UNIVERSITY, Nanjing (CN)

(72) Inventors: Yinguang Chen, Shanghai (CN); Hongqiang Ren, Shanghai (CN); Xiong Zheng, Shanghai (CN); Haining Huang, Shanghai (CN); Hui Liu, Shanghai (CN)

(73) Assignees: Tongji University, Shanghai (CN); Nanjing University, Nanjing (CN)

( * ) Notice: Subject to any disclaimer, the term of this patent is extended or adjusted under 35 U.S.C. 154(b) by 22 days.

(21) Appl. No.: 15/394,196

(22) Filed: Dec. 29, 2016

(65) Prior Publication Data

US 2018/0044213 A1  Feb. 15, 2018

Related U.S. Application Data

(63) Continuation-in-part of application No. 15/366,869, filed on Dec. 1, 2016, now abandoned.

(30) Foreign Application Priority Data

Aug. 12, 2016  (CN) .......................... 2016 1 0664784

(51) Int. Cl.
*C02F 9/00* (2006.01)
*C02F 3/30* (2006.01)
(Continued)

(52) U.S. Cl.
CPC .................. *C02F 9/00* (2013.01); *C02F 3/28* (2013.01); *C02F 3/303* (2013.01); *C02F 3/308* (2013.01);
(Continued)

(58) Field of Classification Search
CPC ........ C02F 9/00; C02F 2103/36; C02F 3/308; C02F 3/28; C02F 3/303; C02F 2101/38;
(Continued)

(56) References Cited

U.S. PATENT DOCUMENTS

2005/0040107 A1* 2/2005 Kasparian ............... C02F 1/444
  210/636
2012/0187042 A1* 7/2012 Coleman ................ C02F 3/006
  210/605

FOREIGN PATENT DOCUMENTS

JP  2002-301500 A  * 10/2002

OTHER PUBLICATIONS

Machine-generated English Translation of CN 103058374, generated on Mar. 17, 2018.*

(Continued)

*Primary Examiner* — Fred Prince
(74) *Attorney, Agent, or Firm* — Wang Law Firm, Inc.

(57) ABSTRACT

A method for treating organic wastewater includes: proceeding with anaerobic fermentation on organic wastewater to obtain a fermentation liquid; nitrifying a portion of the fermentation liquid to obtain a first fermentation liquid containing nitrate nitrogen, and separating the remaining portion of the fermentation liquid to obtain a second fermentation liquid containing propionic acid; mixing the first and second fermentation liquids to obtain a mixture; and removing nitrogen and phosphorus from the mixture and then proceeding with sedimentation to obtain a sediment and a supernatant discharged as purified water. An organic wastewater treating system includes an anaerobic fermentation reactor, an aeration tank, a fermentation liquid separating equipment, a biological removal reactor for removing nitrogen and phosphorus, and a sedimentation tank. The mixing ratio of two fermentation liquids is controlled to achieve balance between carbon, nitrogen, and phosphorus (Continued)

during the nitrogen and phosphorus removal process, achieving highly efficient and simultaneous removal of carbon, nitrogen, and phosphorus without additional carbon source.

18 Claims, 1 Drawing Sheet

(51) Int. Cl.
    *C02F 3/28*     (2006.01)
    *C02F 1/00*     (2006.01)
    *C02F 101/10*     (2006.01)
    *C02F 101/38*     (2006.01)
    *C02F 103/32*     (2006.01)
    *C02F 103/36*     (2006.01)

(52) U.S. Cl.
    CPC .. *C02F 2001/007* (2013.01); *C02F 2101/105* (2013.01); *C02F 2101/38* (2013.01); *C02F 2103/327* (2013.01); *C02F 2103/36* (2013.01)

(58) Field of Classification Search
    CPC .......... C02F 2101/105; C02F 2001/007; C02F 2103/327
    USPC ........ 210/603, 605, 621, 623, 903, 906, 905
    See application file for complete search history.

(56) References Cited

OTHER PUBLICATIONS

Machine-generated English Translation of CN 103601289, generated on Mar. 17, 2018.*
Machine-generated English Translation of JP 2002-301500, generated on Mar. 17, 2018.*

* cited by examiner

METHOD FOR TREATING ORGANIC WASTEWATER AND ORGANIC WASTEWATER TREATING SYSTEM

TECHNICAL FIELD

The present invention belongs to the field of wastewater treating technology and relates to a method for treating organic wastewater and an organic wastewater treating system.

BACKGROUND OF THE INVENTION

Organic wastewater generally contains pollutants including carbon, nitrogen, phosphorus, etc. Carbon pollutants are generally represented by chemical oxygen demand (COD), nitrogen pollutants are generally nitrate nitrogen, and phosphorus pollutants are generally soluble phosphate. These pollutants must be removed to reach the standards for discharge. The conventional anaerobic digestion technology generally turns organics into methane and requires an additional carbon source while removing nitrogen and phosphorus.

BRIEF SUMMARY OF THE INVENTION

In view of deficiency of the conventional technology, the primary objective of the present invention is to provide a method for treating organic wastewater.

Another objective of the present invention is to provide an organic wastewater treating system.

To achieve the above objectives, the solution of the present invention is a method for treating organic wastewater and an organic wastewater treating system.

The method for treating organic wastewater includes:

(1) proceeding with anaerobic fermentation of organic wastewater to obtain fermentation liquid;

(2) nitrifying a portion of the fermentation liquid to obtain the liquid containing nitrate nitrogen, and separating the remaining portion of the fermentation liquid to remove residue, obtaining the liquid containing propionic acid;

(3) mixing the two portions of fermentation liquid which contain nitrate nitrogen and propionic acid to obtain a mixture; and (4) conducting a process for removing nitrogen and phosphorus from the mixture and then proceeding with sedimentation to obtain a supernatant and a sediment, and discharging the supernatant as purified water.

In an example, in step (1), the organic wastewater is wastewater containing protein. The anaerobic fermentation is proceeded at a pH value of 9±0.5, preferably 9. The anaerobic fermentation is proceeded for a period of time ranging from 1 hour to 24 days, preferably 12 days. Before anaerobic fermentation, it is desired to inoculate sludge generated during the discharge of dairy wastewater of a dairy processing plant. The amount of inoculation is 5±1% of the volume of the organic wastewater.

In another example, in step (1), the organic wastewater is wastewater containing carbohydrate. The anaerobic fermentation is proceeded at a pH value of 8±0.5, preferably 8. The anaerobic fermentation is proceeded for a period of time ranging from 0.5 hour to 16 days, preferably 8 days. Before anaerobic fermentation, it is required to inoculate sludge generated during the discharge of alcohol wastewater of an alcohol manufacturing plant. The amount of inoculation is 3.8±1% of the volume of the organic wastewater.

In an example, in step (1), the fermentation liquid includes at least 70 wt % of propionic acid and less than 30 wt % of acetic acid.

In an example, in step (2), the fermentation liquid containing nitrate nitrogen and the fermentation liquid containing propionic acid are mixed at a ratio to make the ratio of a sum of total nitrogen and total phosphorus of the mixture to a biological oxygen demand to be in a range of 1:8 to 1:15, preferably 1:11.

In an example, in step (4), the process for removing nitrogen and phosphorus is conducted at a pH value of 7.5±0.5, preferably 7.5.

The method can further the following steps:

(5) mixing a portion of the sediment with organic wastewater to obtain a second mixture and proceeding with anaerobic fermentation on the second mixture to obtain a second fermentation liquid;

(6) nitrifying a portion of the second fermentation liquid to obtain a third fermentation liquid containing nitrate nitrogen, and separating the remaining portion of the second fermentation liquid to remove residue, obtaining a fourth fermentation liquid containing propionic acid;

(7) mixing the third fermentation liquid containing nitrate nitrogen and the fourth fermentation liquid containing propionic acid to obtain a third mixture; and (8) mixing the third mixture with the remaining portion of the sediment to obtain a fourth mixture, conducting a process for removing nitrogen and phosphorus from the fourth mixture and proceeding with sedimentation to obtain a second supernatant and a second sediment, and discharging the second supernatant as purified water.

In an example, the third mixture is mixed with 0.5-50 wt % of the sediment.

The organic wastewater treating system for carrying out the method for treating organic wastewater includes:

an anaerobic fermentation reactor for proceeding with anaerobic fermentation on organic wastewater to obtain the fermentation liquid;

an aeration tank for proceeding with nitrification of the portion of the fermentation liquid to obtain the fermentation liquid containing nitrate nitrogen;

a fermentation liquid separating equipment for separating the remaining portion of the fermentation liquid and removing the residue to obtain the fermentation liquid containing propionic acid;

a biological removal reactor for removing nitrogen and phosphorus, with the biological removal reactor mixing the fermentation liquid containing nitrate nitrogen and the fermentation liquid containing propionic acid to obtain the mixture for conducting the process for removing nitrogen and phosphorus from the mixture; and a sedimentation tank for proceeding with sedimentation of an effluent of the biological removal reactor for removing nitrogen and phosphorus, obtaining the supernatant and the sediment.

The organic wastewater treating system can further include a distributor. The distributor adds a portion of the sediment into the biological removal reactor for removing nitrogen and phosphorus, thereby mixing the portion of the sediment with the mixture before the process for removing nitrogen and phosphorus. The distributor also adds the remaining portion of the sediment into the anaerobic fermentation reactor to mix with the organic wastewater before anaerobic fermentation.

In a case that the organic wastewater is wastewater containing protein, the anaerobic fermentation can be proceeded at a pH value of 9±0.5, preferably 9. The anaerobic fermentation can be proceeded for a period of time ranging from 1 hour to 24 days, preferably 12 days. Before anaerobic fermentation, it is desired to inoculate sludge generated during discharge of dairy wastewater of a dairy processing plant. The amount of inoculation is 5±1% of the volume of the organic wastewater.

In another case that the organic wastewater is wastewater containing carbohydrate, the anaerobic fermentation can be proceeded at a pH value of 8±0.5, preferably 8. The anaerobic fermentation can be proceeded for a period of time ranging from 0.5 hour to 16 days, preferably 8 days. Before anaerobic fermentation, it is required to inoculate sludge generated during discharge of alcohol wastewater of an alcohol manufacturing plant. The amount of inoculation is 3.8±1% of the volume of the organic wastewater.

The fermentation liquid discharged by the anaerobic fermentation includes at least 70 wt % of propionic acid and less than 30 wt % of acetic acid.

The fermentation liquid containing nitrate nitrogen and the fermentation liquid containing propionic acid can be mixed at a ratio to make a ratio of a sum of total nitrogen and total phosphorus of the mixture to a biological oxygen demand to be in a range of 1:8 to 1:15, preferably 1:11.

The biological removal reactor proceeds with the nitrogen and phosphorus removal process at a pH value of 7.5±0.5, preferably 7.5.

By adopting the above solution, the present invention includes the following advantageous effects.

Firstly, the present invention obtains a fermentation liquid containing a large amount of short-chain fatty acid (such as propionic acid) through control of the anaerobic fermentation conditions of organic wastewater. The fermentation liquid is separated into two portions. One of the two portions is nitrified to turn ammonia nitrogen into nitrate nitrogen that can easily be used by subsequent nitrogen and phosphorus removing microorganisms. The remaining portion of the fermentation liquid is mixed with the fermentation liquid obtained after nitrification to thereby obtain a mixture. When proceeding with removal of nitrogen and phosphorus from the mixture, the nitrogen and phosphorus removal system has sufficient carbon source (short-chain fatty acid). Thus, the present invention can achieve the advantage of a balanced content of carbon, nitrogen, and phosphorus without the need of additional supply of carbon source, nitrogen source, and phosphorus source, which is advantageous to simultaneous and highly efficient removal of carbon, nitrogen, and phosphorus by using nitrogen and phosphorus removing microorganisms.

Secondly, through control of the anaerobic fermentation conditions of organic wastewater, the present invention turns the organic wastewater into short-chain fatty acid, such as propionic acid, which is oriented conversion, rather than conversion into methane. This not only fully utilizes the carbon source but reduces emission of greenhouse gases.

Thirdly, the present invention mix a portion of the sedimentation (sludge) with organic wastewater, and the mixture is then placed into an anaerobic fermentation reactor to proceed with anaerobic fermentation, which not only improves the yield of short-chain fatty acid but achieves utilization of sludge, thereby reducing the amount of sludge.

The present invention will become clearer in light of the following detailed description of illustrative embodiments of this invention described in connection with the drawings.

DETAILED DESCRIPTION OF THE INVENTION

Figure 1:
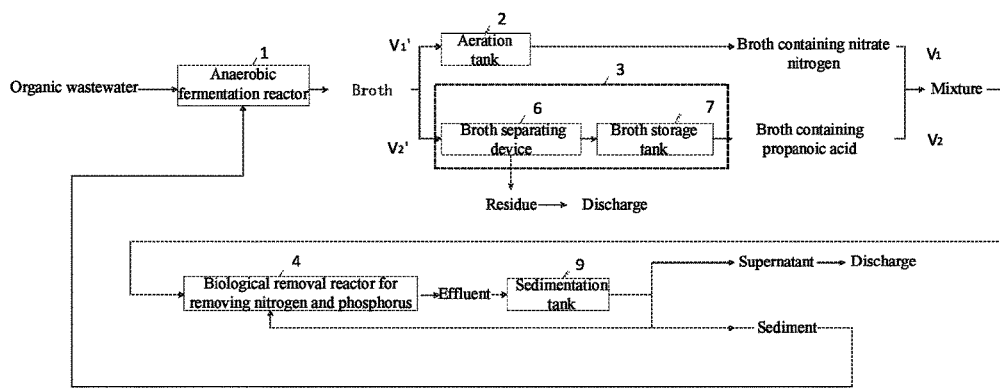
FIG. 1 is a schematic diagram illustrating a first example of an organic wastewater treating system according to the present invention.

The present invention provides a method for treating organic wastewater and an organic wastewater treating system.

<<Method for Treating Organic Wastewater>>

The method for treating organic wastewater according to the present invention includes the following steps of:

(1) proceeding with anaerobic fermentation on organic wastewater to obtain a fermentation liquid;

(2) nitrifying a portion (having a volume of $V_1'$) of the fermentation liquid to obtain the liquid containing nitrate nitrogen, and separating the remaining portion (having a volume of $V_2'$) of the fermentation liquid to remove residue, obtaining a liquid serving as a fermentation liquid containing propionic acid;

(3) mixing the fermentation liquid containing nitrate nitrogen and the fermentation liquid containing propionic acid to obtain a mixture; and (4) conducting a process for removing nitrogen and phosphorus from the mixture and then proceeding with sedimentation to obtain a supernatant and a sediment, and discharging the supernatant as purified water.

In step (1), the organic wastewater can be wastewater containing protein, preferably dairy wastewater and food processing wastewater. Dairy wastewater includes wastewater discharged during the process for manufacturing condensed milk, cheese, butter, dairy refreshing drinks, ice creams, and dairy desserts, mainly from water for cleaning vessels and equipment, wherein dairy raw materials are included in the wastewater.

When the organic wastewater is wastewater containing protein, the pH value of the anaerobic fermentation system can be 9±0.5, preferably 9. The anaerobic fermentation can be proceeded for a period of time ranging from 1 hour to 24 days, preferably 12 days. The average anaerobic fermentation temperature is 28° C. Before anaerobic fermentation, it is required to inoculate sludge generated during discharge of dairy wastewater of a dairy processing plant. The sludge is grey black and contains anaerobic fermenting microorganisms whose average VSS/TSS is 0.78. The amount of inoculation is 5% of the volume of the initial organic wastewater.

Alternatively, in step (1), the organic wastewater can be wastewater containing carbohydrate, preferably "beer wastewater". Beer wastewater means the wastewater discharged during the process for manufacturing beer, including wastewater resulting from cleaning the raw materials and wastewater produced during the brewing process.

When the organic wastewater is wastewater containing carbohydrate, the pH value of the anaerobic fermentation system can be 8±0.5, preferably 8. The anaerobic fermentation can be proceeded for a period of time ranging from 0.5 hour to 16 days, preferably 8 days. The anaerobic fermentation temperature is 23° C. Before anaerobic fermentation, it is required to inoculate sludge generated during discharge of alcohol wastewater of an alcohol manufacturing plant. The sludge is yellow black and contains anaerobic fermenting microorganisms whose average VSS/TSS is 0.86. The amount of inoculation is 3.8% of the volume of the initial organic wastewater.

In step (1), the biological oxygen demand (BOD) of the organic wastewater can be 2240-3100 mg/L, the total nitrogen can be 90-120 mg/L, the ammonia nitrogen can be 85-106 mg/L, and the total phosphate can be 20-28.3 mg/L.

In step (1), the fermentation liquid includes at least 70 wt % of propionic acid. In step (2), the fermentation liquid obtained from step (1) is separated into two portions (the volumes of which are $V_1'$ and $V_2'$, respectively). One of the two portions (having the volume of $V_1'$) is proceeded with nitrification to turn ammonia nitrogen into nitrate nitrogen and to turn carbon into carbon dioxide, thereby obtaining a fermentation liquid containing nitrate nitrogen. The remaining portion (having the volume of $V_2'$) undergoes separation to remove the residue and to keep the liquid, thereby obtaining the fermentation liquid containing propionic acid.

In step (2), during the nitrification, it is required to inoculate sludge generated during processing of landfill leachate of a waste treatment plant. The sludge is yellow black and contains nitrifying bacteria whose average VSS/TSS is 0.71. The amount of inoculation is 3% of the volume of the fermentation liquid (having the volume of $V_1'$) to be nitrified. The temperature of nitrification is 24° C.

In step (3), the fermentation liquid containing nitrate nitrogen and the fermentation liquid containing propionic acid are mixed at a ratio to make the ratio of the sum of total nitrogen and total phosphorus of the mixture to the BOD to be in a range of 1:8 to 1:15, preferably 1:11. By controlling the ratio of the sum of total nitrogen and total phosphorus of the mixture to the BOD to be in a range of 1:8 to 1:15, the carbon source required for growth and metabolism of the microorganisms during removal of nitrogen and phosphorus can be fulfilled while assuring that the wastewater after treatment will not cause secondary pollution resulting from a large excessive amount of carbon source. The total nitrogen concentration can be determined by persulfate oxidation method. The total phosphorus concentration can be determined by ammonium molybdate spectrophotometric method. The biological oxygen demand can be determined by microbial detection method.

In step (3), the mixture of the fermentation liquid containing nitrogen and the fermentation liquid containing propionic acid can include 6.25-60.25 vt % of the fermentation liquid containing nitrate nitrogen and 39.75-93.75 vt % of the fermentation liquid containing propionic acid.

In step (4), regarding the condition of removing nitrogen and phosphorus from the mixture, the nitrogen and phosphorus removal system can have a pH value of 7.5±0.5, preferably 7.5. Before the process for removing nitrogen and phosphorus, it is required to inoculate sludge discharged by a city sewage treatment plant. The sludge is yellow black and contains nitrogen and phosphorus removing microorganisms whose average VSS/TSS is 0.65. The amount of inoculation is 8% of the volume of the mixture. The reaction temperature is 22° C.

In step (4), the process for removing nitrogen and phosphorus from the mixture is conducted, and sedimentation is then proceeded to obtain a supernatant and a sediment. The supernatant is purified water and can be directly discharged or used. The sediment is sludge which can be separated into two portions. One of the two portions (0.5-50 wt % of the sludge) is mixed with the mixture before the process for removing nitrogen and phosphorus, and the process for removing nitrogen and phosphorus is then proceeded. The remaining portion of the sludge is mixed with organic wastewater before anaerobic fermentation, and anaerobic fermentation is then proceeded.

Namely, the method can further include the following steps of:

(5) mixing a portion of the sediment with organic wastewater to obtain a second mixture and proceeding with anaerobic fermentation on the second mixture to obtain a second fermentation liquid;

(6) nitrifying a portion of the second fermentation liquid to obtain a third fermentation liquid containing nitrate nitrogen, and separating the remaining portion of the second fermentation liquid to remove residue, obtaining a fourth fermentation liquid containing propionic acid;

(7) mixing the third fermentation liquid containing nitrate nitrogen and the fourth fermentation liquid containing propionic acid to obtain a third mixture; and (8) mixing the third mixture with the remaining portion of the sediment to obtain a fourth mixture, conducting a process for removing nitrogen and phosphorus from the fourth mixture and proceeding with sedimentation to obtain a second supernatant and a second sediment, and discharging the second supernatant as purified water.

Conclusively, the present invention controls the mixing ratio of two fermentation liquid to achieve balance between carbon, nitrogen, and phosphorus during the nitrogen and phosphorus removal process, such that highly efficient and simultaneous removal of carbon, nitrogen, and phosphorus can be achieved without supply of additional carbon source.

<<Organic Wastewater Treating System>>

With reference to FIG. 1, the present invention provides an organic wastewater treating system for carrying out the method for treating organic wastewater. The organic wastewater treating system includes an anaerobic fermentation reactor 1, an aeration tank 2, a fermentation liquid separating equipment 3, a biological removal reactor 4 for removing nitrogen and phosphorus, and a sedimentation tank 9.

The anaerobic fermentation reactor 1 is used to proceed with anaerobic fermentation of organic wastewater to obtain the fermentation liquid. The fermentation liquid includes at least 70 wt % of propionic acid.

The organic wastewater can be wastewater containing protein. Wastewater containing protein means the protein content in the wastewater is higher than non-protein organics in the wastewater and is preferably dairy wastewater and food processing wastewater. Dairy wastewater includes wastewater discharged during the process for manufacturing condensed milk, cheese, butter, dairy refreshing drinks, ice creams, and dairy desserts, mainly from water for cleaning vessels and equipment, wherein dairy raw materials are included in the wastewater. Food processing wastewater means wastewater generated during processing of food, such as cakes and bread. During anaerobic fermentation of wastewater containing protein, the pH value of the anaerobic fermentation system can be 9±0.5, preferably 9. The anaerobic fermentation can be proceeded for a period of time ranging from 1 hour to 24 days, preferably 12 days.

Alternatively, the organic wastewater can be wastewater containing carbohydrate. Wastewater containing carbohydrate means the carbohydrate content in the wastewater is higher than non-carbohydrate substances in the wastewater and is preferably "beer wastewater". Beer wastewater means the wastewater discharged during the process for manufacturing beer, including wastewater resulting from cleaning the raw materials and wastewater produced during the brewing process. During anaerobic fermentation of wastewater containing carbohydrate, the pH value of the anaerobic fermentation system can be 8±0.5, preferably 8. The anaerobic fermentation can be proceeded for a period of time ranging from 0.5 hour to 16 days, preferably 8 days.

The aeration tank 2 is used to proceed with nitrification of a portion (having a volume of $V_1'$) of the fermentation liquid to turn ammonia nitrogen into nitrate nitrogen. At the same time, carbon (represented by COD) turns into carbon dioxide. Thus, the fermentation liquid containing nitrate nitrogen is obtained. The fermentation liquid entering the aeration tank 2 contains short-chain fatty acid (such as propionic acid), ammonic nitrogen, phosphate, etc. The liquid discharged from the aeration tank 2 contains short-chain fatty acid (such as propionic acid), ammonic nitrogen or nitrite nitrogen, phosphate, etc.

The fermentation liquid separating equipment 3 includes a fermentation liquid separating device 6 and a fermentation liquid storage tank 7. The fermentation liquid separating device 6 separates the remaining portion (having a volume of $V2'$) of the fermentation liquid to remove the residue and to keep the liquid, thereby obtaining the fermentation liquid containing propionic acid. The fermentation liquid storage tank 7 is used to store the fermentation liquid containing propionic acid.

The biological removal reactor 4 for removing nitrogen and phosphorus is configured to mix the fermentation liquid containing nitrate nitrogen and the fermentation liquid containing propionic acid to obtain the mixture for conducting the process for removing nitrogen and phosphorus from the mixture. The fermentation liquid containing nitrate nitrogen and the fermentation liquid containing propionic acid are mixed at a ratio to make the ratio of the sum of total nitrogen and total phosphorus of the mixture to the biological oxygen demand (BOD) to be in a range of 1:8 to 1:15, preferably 1:11. Regarding the condition of removing nitrogen and phosphorus from the mixture, the nitrogen and phosphorus removal system can have a pH value of 7.5±0.5, preferably 7.5.

The operating principle of simultaneously removing carbon, nitrogen, and phosphorus in the mixture by the biological removal reactor 4 is follows:

Since the mixture contains a large amount of short-chain fatty acid (such as propionic acid, acetic acid, etc.), the nitrogen and phosphorus removing microorganisms living in the biological removal reactor 4 can turn the short-chain fatty acid into intracellular carbon source under the anaerobic fermentation condition, which is equivalent to a reduction in the content of the short-chain fatty acid in the mixture, achieving a carbon removing effect. Since the nitrogen and phosphorus removing microorganisms obtains sufficient intracellular carbon source, the nitrogen and phosphorus removing microorganisms decompose the intracellular carbon source under an anaerobic or aerobic condition and uses the energy and reduction power resulting from decomposition of the intracellular carbon source to proceed with the reaction of absorption of phosphorus and removal of nitrogen. Thus, the carbon source, the nitrogen source, and the phosphorus source in the mixture are removed simultaneously. Since the nitrogen and phosphorus removing microorganisms have sufficient carbon source while removing phosphorus and nitrogen, simultaneous removal of the nitrogen source and the phosphorus source can be achieved without supply of additional carbon source.

The sedimentation tank 9 achieves the effect of a secondary settling tank and is configured to proceed with sedimentation of an effluent of the biological removal reactor 4 for removing nitrogen and phosphorus, obtaining a supernatant and a sediment. The supernatant is purified water and can be directly discharged or used. The sediment is sludge which can be separated into two portions. One of the two portions (0.5-50 wt % of the sludge) is mixed with the mixture before the process for removing nitrogen and phosphorus. The remaining portion of the sludge is mixed with organic wastewater before anaerobic fermentation.

The organic wastewater treating system carries out the method for treating organic wastewater including the following steps:

(1) the anaerobic fermentation reactor 1 proceeds with anaerobic fermentation on organic wastewater to obtain the fermentation liquid;

(2) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain a fermentation liquid containing propionic acid, and the fermentation liquid storage tank 7 temporarily stores the fermentation liquid containing propionic acid;

(3) the fermentation liquid (having a volume of $V_1'$) containing nitrate nitrogen is mixed with the fermentation liquid (having a volume of $V_2'$) containing propionic acid to obtain a mixture;

(4) the biological removal reactor 4 for removing nitrogen and phosphorus proceeds with a nitrogen and phosphorus removal process to remove nitrogen and phosphorus from the mixture; and (5) the sedimentation tank 9 proceeds with sedimentation of an effluent of the biological removal reactor 4 for removing nitrogen and phosphorus to obtain a supernatant and a sediment, and the supernatant is discharged as purified water.

Figure 2:
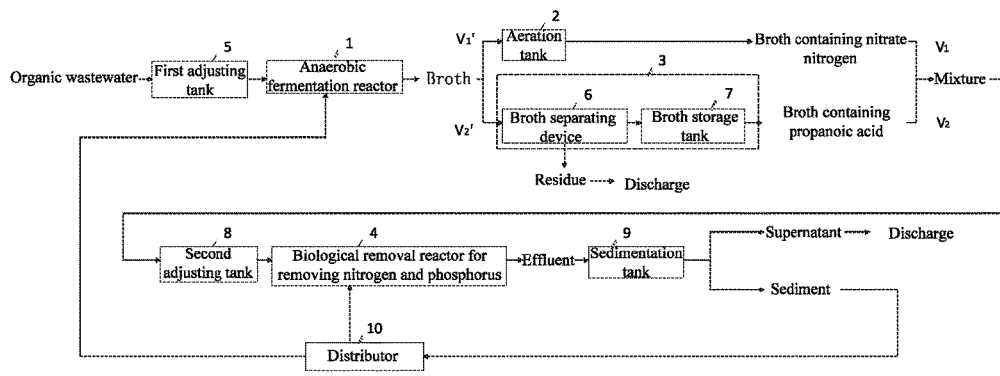
FIG. 2 is a schematic diagram illustrating a second example of an organic wastewater treating system according to the present invention.

With reference to FIG. 2, according to the practical situation, the organic wastewater treating system can further include a first adjusting tank 5, a second adjusting tank 8, and a distributor 10.

The first adjusting tank 5 is used to adjust the quantity and the quality of the organic wastewater to be homogenous. Then, the homogenous organic wastewater enters the anaerobic fermentation reactor 1. Since the flow or the properties of the organic wastewater often fluctuates, the first adjusting tank 5 is desired to adjust the flow or the properties of the organic wastewater, thereby stabilizing the organic wastewater to avoid large influence on each subsequent procedure resulting from significant change in the flow or the properties of organic wastewater.

The second adjusting tank 8 is used to adjust the quantity and the properties of the mixture to be homogenous. Then, the homogenous mixture enters the biological removal reactor 4 for removing nitrogen and phosphorus.

The distributor 10 is used to add a portion of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

The above organic wastewater treating system carries out the method for treating organic wastewater including the following steps:

(1) the first adjusting tank 5 adjusts the quantity and the properties of the organic wastewater to be homogenous;

(2) the anaerobic fermentation reactor 1 proceeds with anaerobic fermentation on the homogenous organic wastewater discharged from the first adjusting tank 5 to obtain a froth;

(3) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain a fermentation liquid containing propionic acid, and the fermentation liquid storage tank 7 temporarily stores the fermentation liquid containing propionic acid;

(4) the fermentation liquid (having a volume of $V_1'$) containing nitrate nitrogen is mixed with the fermentation liquid (having a volume of $V_2'$) containing propionic acid to obtain a mixture;

(5) the second adjusting tank 8 adjusts the quantity and the properties of the mixture to be homogenous;

(6) the biological removal reactor 4 for removing nitrogen and phosphorus proceeds with a nitrogen and phosphorus removal process to remove nitrogen and phosphorus from the homogeneous mixture;

(7) the sedimentation tank 9 proceeds with sedimentation of an effluent of the biological removal reactor 4 for removing nitrogen and phosphorus to obtain a supernatant and a sediment, and the supernatant is discharged as purified water; and (8) the distributor 10 adds a portion of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

The present invention will be further described using the following examples.

Example 1

This example provides a method for treating organic wastewater including the following steps:

(1) organic wastewater (dairy wastewater) enters the first adjusting tank 5, and the first adjusting tank 5 adjusts the quantity and the properties of the dairy wastewater to be homogenous, wherein the biological oxygen demand (BOD) of the dairy wastewater is 2240 mg/L, the total nitrogen is 111.6 mg/L, the ammonia nitrogen is 105 mg/L, and the total phosphate is 28.3 mg/L;

(2) the anaerobic fermentation reactor 1 proceeds with anaerobic fermentation on the output water (homogenous organic wastewater) discharged from the first adjusting tank 5 to obtain a froth, wherein the pH value of the anaerobic fermentation system is 8.5, the fermentation time (the hydraulic retention time, HRT) is 1 hour, and the fermentation liquid includes 74% of propionic acid and 25% of acetic acid;

(3) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain the fermentation liquid containing propionic acid, and the fermentation liquid storage tank 7 temporarily stores the fermentation liquid containing propionic acid;

(4) the fermentation liquid (having a volume of $V_1'$) containing nitrate nitrogen is mixed with the fermentation liquid (having a volume of $V_2'$) containing propionic acid at a ratio of 1:1 to obtain a mixture;

(5) the second adjusting tank 8 adjusts the quantity and the properties of the mixture to be homogenous;

(6) the biological removal reactor 4 for removing nitrogen and phosphorus proceeds with a nitrogen and phosphorus removal process to remove nitrogen and phosphorus from the homogeneous mixture;

(7) the sedimentation tank 9 proceeds with sedimentation of an effluent of the biological removal reactor 4 (SBR reactor) for removing nitrogen and phosphorus to obtain a supernatant and a sediment, and the supernatant is discharged as purified water, wherein the pH value of the biological removal reactor 4 for removing nitrogen and phosphorus is 7.0; and (8) the distributor 10 adds a portion (0.5 wt % of the sediment) of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

After detection, with regard to the organic wastewater, in this example, the removal rate of BOD of the purified water is 98.8%, the removal rate of total nitrogen (TN) is 83.6%, and the removal rate of total phosphate is 92.2%.

Example 2

This example provides a method for treating organic wastewater including the following steps:

(1) organic wastewater (dairy wastewater) enters the first adjusting tank 5, and the first adjusting tank 5 adjusts the quantity and the properties of the dairy wastewater to be homogenous, wherein the biological oxygen demand (BOD) of the dairy wastewater is 2240 mg/L, the total nitrogen is 111.6 mg/L, the ammonia nitrogen is 105 mg/L, and the total phosphate is 28.3 mg/L;

(2) the anaerobic fermentation reactor 1 proceeds with anaerobic fermentation on the output water (homogenous organic wastewater) discharged from the first adjusting tank 5 to obtain a froth, wherein the pH value of the anaerobic fermentation system is 9.5, the fermentation time (the hydraulic retention time, HRT) is 24 days, and the fermentation liquid includes 78% of propionic acid and 22% of acetic acid;

(3) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain the fermentation liquid containing propionic acid, and the fermentation liquid storage tank 7 temporarily stores the fermentation liquid containing propionic acid;

(4) the fermentation liquid containing nitrate nitrogen is mixed with the fermentation liquid containing propionic acid to obtain a mixture including 6.25 vt % of the fermentation liquid containing nitrate nitrogen and 93.75 vt % of the fermentation liquid containing propionic acid;

(5) the second adjusting tank 8 adjusts the quantity and the properties of the mixture to be homogenous;

(6) the biological removal reactor 4 for removing nitrogen and phosphorus proceeds with a nitrogen and phosphorus removal process to remove nitrogen and phosphorus from the homogeneous mixture;

(7) the sedimentation tank 9 proceeds with sedimentation of an effluent of the biological removal reactor 4 (SBR reactor) for removing nitrogen and phosphorus to obtain a supernatant and a sediment, and the supernatant is discharged as purified water, wherein the pH value of the biological removal reactor 4 for removing nitrogen and phosphorus is 8.0; and (8) the distributor 10 adds a portion (50 wt % of the sediment) of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

After detection, with regard to the organic wastewater, in this example, the removal rate of BOD of the purified water is 99.8%, the removal rate of total nitrogen (TN) is 86.6%, and the removal rate of total phosphate is 98.2%.

Example 3

This example provides a method for treating organic wastewater including the following steps:

(1) organic wastewater (dairy wastewater) enters the first adjusting tank 5, and the first adjusting tank 5 adjusts the quantity and the properties of the dairy wastewater to be homogenous, wherein the biological oxygen demand (BOD) of the dairy wastewater is 2240 mg/L, the total nitrogen is 111.6 mg/L, the ammonia nitrogen is 105 mg/L, and the total phosphate is 28.3 mg/L;

(2) the anaerobic fermentation reactor 1 proceeds with anaerobic fermentation on the output water (homogenous organic wastewater) discharged from the first adjusting tank 5 to obtain a froth, wherein the pH value of the anaerobic fermentation system is 9, the fermentation time (the hydraulic retention time, HRT) is 12 days, and the fermentation liquid includes 81% of propionic acid and 19% of acetic acid;

(3) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain the fermentation liquid containing propionic acid, and the fermentation liquid storage tank 7 temporarily stores the fermentation liquid containing propionic acid;

(4) the fermentation liquid containing nitrate nitrogen is mixed with the fermentation liquid containing propionic acid to obtain a mixture including 31.25 vt % of the fermentation liquid containing nitrate nitrogen and 68.75 vt % of the fermentation liquid containing propionic acid;

(5) the second adjusting tank 8 adjusts the quantity and the properties of the mixture to be homogenous;

(6) the biological removal reactor 4 for removing nitrogen and phosphorus proceeds with a nitrogen and phosphorus removal process to remove nitrogen and phosphorus from the homogeneous mixture;

(7) the sedimentation tank 9 proceeds with sedimentation of an effluent of the biological removal reactor 4 (SBR reactor) for removing nitrogen and phosphorus to obtain a supernatant and a sediment, and the supernatant is discharged as purified water, wherein the pH value of the biological removal reactor 4 for removing nitrogen and phosphorus is 7.5; and (8) the distributor 10 adds a portion (10 wt % of the sediment) of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

After detection, with regard to the organic wastewater, in this example, the removal rate of BOD of the purified water is 99.9%, the removal rate of total nitrogen (TN) is 91.8%, and the removal rate of total phosphate is 99.1%.

Example 4

This example provides a method for treating organic wastewater including the following steps:

(1) organic wastewater (food processing wastewater) enters the first adjusting tank 5, and the first adjusting tank 5 adjusts the quantity and the properties of the food processing wastewater to be homogenous, wherein the biological oxygen demand (BOD) of the food processing wastewater is 3100 mg/L, the total nitrogen is 90 mg/L, the ammonia nitrogen is 85 mg/L, and the total phosphate is 22 mg/L;

(2) the anaerobic fermentation reactor 1 proceeds with anaerobic fermentation on the output water (homogenous organic wastewater) discharged from the first adjusting tank 5 to obtain a froth, wherein the pH value of the anaerobic fermentation system is 9, the fermentation time (the hydraulic retention time, HRT) is 12 days, and the fermentation liquid includes 80% of propionic acid and 20% of acetic acid;

(3) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain the fermentation liquid containing propionic acid, and the fermentation liquid storage tank 7 temporarily stores the fermentation liquid containing propionic acid;

(4) the fermentation liquid containing nitrate nitrogen is mixed with the fermentation liquid containing propionic acid to obtain a mixture including 60.25 vt % of the fermentation liquid containing nitrate nitrogen and 39.75 vt % of the fermentation liquid containing propionic acid;

(5) the second adjusting tank 8 adjusts the quantity and the properties of the mixture to be homogenous;

(6) the biological removal reactor 4 for removing nitrogen and phosphorus proceeds with a nitrogen and phosphorus removal process to remove nitrogen and phosphorus from the homogeneous mixture;

(7) the sedimentation tank 9 proceeds with sedimentation of an effluent of the biological removal reactor 4 (A2O reactor) for removing nitrogen and phosphorus to obtain a supernatant and a sediment, and the supernatant is discharged as purified water, wherein the pH value of the biological removal reactor 4 for removing nitrogen and phosphorus is 7.5; and (8) the distributor 10 adds a portion (10 wt % of the sediment) of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

After detection, with regard to the organic wastewater, in this example, the removal rate of BOD of the purified water is 99.9%, the removal rate of total nitrogen (TN) is 94.8%, and the removal rate of total phosphate is 99.6%.

Example 5

This example provides a method for treating organic wastewater including the following steps:

(1) organic wastewater (beer wastewater) enters the first adjusting tank 5, and the first adjusting tank 5 adjusts the quantity and the properties of the beer wastewater to be homogenous, wherein the biological oxygen demand (BOD) of the beer wastewater is 2900 mg/L, the total nitrogen is 120 mg/L, the ammonia nitrogen is 106 mg/L, and the total phosphate is 20 mg/L;

(2) the anaerobic fermentation reactor 1 proceeds with anaerobic fermentation on the output water (homogenous organic wastewater) discharged from the first adjusting tank 5 to obtain a froth, wherein the pH value of the anaerobic fermentation system is 8, the fermentation time (the hydraulic retention time, HRT) is 8 days, and the fermentation liquid includes 84% of propionic acid and 16% of acetic acid;

(3) the aeration tank 2 proceeds with nitrification of a portion (having a volume of $V_1'$) of the fermentation liquid to obtain a fermentation liquid containing nitrate nitrogen, the fermentation liquid separating device 6 proceeds with separation of the remaining portion (having a volume of $V_2'$) of the fermentation liquid to remove the residue to thereby obtain the fermentation liquid containing propionic acid, and the fermentation liquid storage tank 7 temporarily stores the fermentation liquid containing propionic acid;

(4) the fermentation liquid containing nitrate nitrogen is mixed with the fermentation liquid containing propionic acid to obtain a mixture including 46.9 vt % of the fermentation liquid containing nitrate nitrogen and 53.1 vt % of the fermentation liquid containing propionic acid;

(5) the second adjusting tank 8 adjusts the quantity and the properties of the mixture to be homogenous;

(6) the biological removal reactor 4 for removing nitrogen and phosphorus proceeds with a nitrogen and phosphorus removal process to remove nitrogen and phosphorus from the homogeneous mixture;

(7) the sedimentation tank 9 proceeds with sedimentation of an effluent of the biological removal reactor 4 (A2O reactor) for removing nitrogen and phosphorus to obtain a supernatant and a sediment, and the supernatant is discharged as purified water, wherein the pH value of the biological removal reactor 4 for removing nitrogen and phosphorus is 7.5; and (8) the distributor 10 adds a portion (10 wt % of the sediment) of the sediment into the biological removal reactor 4 for removing nitrogen and phosphorus, thereby mixing the portion of the sediment with the mixture before the process for removing nitrogen and phosphorus. Then, the process for removing nitrogen and phosphorus is conducted. The distributor also adds the remaining portion of the sediment into the anaerobic fermentation reactor 1 to mix with the organic wastewater before anaerobic fermentation, and the anaerobic fermentation is then conducted.

After detection, with regard to the organic wastewater, in this example, the removal rate of BOD of the purified water is 99.9%, the removal rate of total nitrogen (TN) is 97.8%, and the removal rate of total phosphate is 99.8%.

The descriptions of the above embodiments are only intended for easy understanding and use of the invention by persons having ordinary skill in the art. Apparently, a person skilled in the art can easily made various modifications to these embodiments and can apply the general principle of the description in other embodiments without creative labor. Thus, the invention is not limited to the above embodiments, and a person skilled in the art can make improvements and modifications based on the disclosure of the invention without departing from the scope of the invention, and the improvements and the modifications are still within the protection scope of the invention.

The invention claimed is:

1. A method for treating organic wastewater comprising:
proceeding with anaerobic fermentation on organic wastewater to obtain a fermentation liquid, wherein the organic wastewater is selected from a kind of wastewater containing protein, and the anaerobic fermentation is proceeded at a pH value of 9±0.5 for a period of time ranging from 1 hour to 24 days or a kind of wastewater containing carbohydrate, the anaerobic fermentation is proceeded at a pH value of 8±0.5 for a period of time ranging from 0.5 hour to 16 days;
nitrifying a portion of the fermentation liquid to obtain a fermentation liquid containing nitrate nitrogen, and separating a remaining portion of the fermentation liquid to remove residue, obtaining a fermentation liquid containing propionic acid;
mixing the fermentation liquid containing nitrate nitrogen and the fermentation liquid containing propionic acid to obtain a mixture; and
conducting a process for removing nitrogen and phosphorus from the mixture and then proceeding with sedimentation to obtain a supernatant and a sediment, and discharging the supernatant as purified water.

2. The method according to claim 1, wherein the anaerobic fermentation is proceeded at a pH value of 9 for 12 days.

3. The method according to claim 1, wherein sludge generated during discharge of dairy wastewater of a dairy processing plant is inoculated into the organic wastewater before anaerobic fermentation, and an amount of inoculation is 5±1% of a volume of the organic wastewater.

4. The method according to claim 1, wherein the anaerobic fermentation is proceeded at a pH value of 8 for 8 days.

5. The method according to claim 1, wherein sludge generated during discharge of alcohol wastewater of an alcohol manufacturing plant is inoculated into the organic wastewater before anaerobic fermentation, and an amount of inoculation is 3.8±1% of a volume of the organic wastewater.

6. The method according to claim 1, wherein:
in step (1), the fermentation liquid includes at least 70 wt % of propionic acid; and/or
in step (2), the fermentation liquid containing nitrate nitrogen and the fermentation liquid containing propionic acid are mixed at a ratio to make a ratio of a sum of total nitrogen and total phosphorus of the mixture to a biological oxygen demand to be in a range of 1:8 to 1:15; and/or
in step (4), the process for removing nitrogen and phosphorus is conducted at a pH value of 7.5±0.5.

7. The method according to claim 6, wherein:
in step (2), the fermentation liquid containing nitrate nitrogen and the fermentation liquid containing propionic acid are mixed at a ratio to make the ratio of the sum of total nitrogen and total phosphorus of the mixture to the biological oxygen demand to be 1:11; and/or
in step (4), the process for removing nitrogen and phosphorus is conducted at a pH value of 7.5.

8. The method according to claim 1, further comprising:
mixing a portion of the sediment with organic wastewater to obtain a second mixture and proceeding with anaerobic fermentation on the second mixture to obtain a second fermentation liquid;
nitrifying a portion of the second fermentation liquid to obtain a third fermentation liquid containing nitrate nitrogen, and separating a remaining portion of the second fermentation liquid to remove residue, obtaining a fourth froth containing propionic acid;
mixing the third fermentation liquid containing nitrate nitrogen and the fourth fermentation liquid containing propionic acid to obtain a third mixture; and
mixing the third mixture with a remaining portion of the sediment to obtain a fourth mixture, conducting a process for removing nitrogen and phosphorus from the fourth mixture and proceeding with sedimentation to obtain a second supernatant and a second sediment, and discharging the second supernatant as purified water.

9. The method according to claim 8, wherein the third mixture is mixed with 0.5-50 wt % of the sediment.

10. An organic wastewater treating system for carrying out the method for treating organic wastewater according to claim 1, with the organic wastewater treating system comprising:
an anaerobic fermentation reactor for proceeding with anaerobic fermentation on organic wastewater to obtain the fermentation liquid;
an aeration tank for proceeding with nitrification of the portion of the fermentation liquid to obtain the fermentation liquid containing nitrate nitrogen;
a fermentation liquid separating equipment for separating the remaining portion of the fermentation liquid and removing the residue to obtain the fermentation liquid containing propionic acid;
a biological removal reactor for removing nitrogen and phosphorus, with the biological removal reactor mixing the fermentation liquid containing nitrate nitrogen and the fermentation liquid containing propionic acid to obtain the mixture for conducting the process for removing nitrogen and phosphorus from the mixture; and
a sedimentation tank for proceeding with sedimentation of an effluent of the biological removal reactor for removing nitrogen and phosphorus, obtaining the supernatant and the sediment.

11. The organic wastewater treating system according to claim 10, further comprising a distributor, with the distributor adding a portion of the sediment into the biological removal reactor for removing nitrogen and phosphorus, thereby mixing the portion of the sediment with the mixture before the process for removing nitrogen and phosphorus, with the distributor also adding a remaining portion of the sediment into the anaerobic fermentation reactor to mix with the organic wastewater before anaerobic fermentation.

12. The organic wastewater treating system according to claim 11, wherein the portion of the sediment is about 0.50-50 wt % of the sediment.

13. The organic wastewater treating system according to claim 10, wherein the organic wastewater is wastewater containing protein, and the anaerobic fermentation is proceeded at a pH value of 9±0.5 for a period of time ranging from 1 hour to 24 days.

14. The organic wastewater treating system according to claim 13, wherein the anaerobic fermentation is proceeded at a pH value for 12 days.

15. The organic wastewater treating system according to claim 10, wherein the organic wastewater is wastewater containing carbohydrate, and the anaerobic fermentation is proceeded at a pH value of 8±0.5 for a period of time ranging from 0.5 hour to 16 days.

16. The organic wastewater treating system according to claim 15, wherein the anaerobic fermentation is proceeded at a pH value of 8 for 8 days.

17. The organic wastewater treating system according to claim 10, wherein:
the fermentation liquid includes at least 70 wt % of propionic acid; and/or
the fermentation liquid containing nitrate nitrogen and the fermentation liquid containing propionic acid are mixed at a ratio to make a ratio of a sum of total nitrogen and total phosphorus of the mixture to a biological oxygen demand to be in a range of 1:8 to 1:15; and/or
the process for removing nitrogen and phosphorus is conducted at a pH value of 7.5±0.5.

18. The organic wastewater treating system according to claim 17, wherein:
the fermentation liquid containing nitrate nitrogen and the fermentation liquid containing propionic acid are mixed at a ratio to make the ratio of the sum of total nitrogen and total phosphorus of the mixture to the biological oxygen demand to be 1:11; and/or
the process for removing nitrogen and phosphorus is conducted at a pH value of 7.5.

* * * * *